United States Patent [19]
Vergara et al.

[11] 3,810,253
[45] May 7, 1974

[54] MOTOR SPEED CONTROL

[76] Inventors: Jose D. Vergara, San Ismael No. 845, Jardines de los Areis; Ramon Galvan, lo. Circunvalacion Div. Nte. No. 177 col. Independencia; Fausto Leal, Calle 16 No. 8 U. Clemente Orojes, all of Guadalajara, Mexico

[22] Filed: Oct. 25, 1972

[21] Appl. No.: 300,862

Related U.S. Application Data

[63] Continuation-in-part of Ser. No. 174,326, Aug. 24, 1971, abandoned, Continuation-in-part of Ser. No. 174,327, Aug. 24, 1971.

[52] U.S. Cl. .............................. 318/237, 318/241
[51] Int. Cl. .......................................... H02k 17/16
[58] Field of Search.................. 318/237, 197, 241; 310/68 R

[56] References Cited
UNITED STATES PATENTS
3,586,935  6/1971  Lundelius ........................ 318/237
3,529,224  9/1970  Bedford .......................... 318/237

*Primary Examiner*—Bernard A. Gilheany
*Assistant Examiner*—Thomas Langer
*Attorney, Agent, or Firm*—Anthony A. O'Brien

[57] ABSTRACT

An electronic speed control device for controlling the speed of three phase motors of the wound rotor type includes a plurality of electronic elements each adapted to regulate the amount of the alternating current passed therethrough and induced to an associated phase of the rotor. The electronic elements provide a controlled short circuiting for all three phases of the rotor due to the setup of unidirectional current paths related to the biasing of the current. Each electronic element has a gate electrode connected to a master control circuit to be enabled thereby and thus pass a controlled current in the appropriate amount and at the precise time with a substantial suppression of the Joulean effect. The control circuit is integral within a motor housing and rotates with a shaft supporting the rotor. Slip rings may be utilized to provide electrical connections between the gate electrodes and the master control circuit which may be also exterior of the motor housing.

25 Claims, 11 Drawing Figures

MOTOR SPEED CONTROL

CROSS REFERENCE TO RELATED APPLICATIONS

The present application is continuation-in-part of our applications Ser. No. 174,326 now abandoned and 174,327, both filed Aug. 24, 1971.

BACKGROUND OF THE INVENTION

1. Field of the Invention:

The present invention relates to an electronic device for controlling the speed of three phase motors of the wound rotor type. More particularly, the present invention relates to an electronic control for varying the speed of a three phase motor of the wound rotor type by which the speed of the motor can be varied over a broad range from a value near zero up to the rated speed of the motor.

2. Description of the Prior Art:

In the field of electric motors there has long been a problem of relating the control of the speed of the motor to the use of the motor. It is known that substantial speed control for DC motors can be obtained by using devices which are known in the art. However, speed control for AC motors, particularly three-phase motors, has not been heretofore obtained except with a great energy waste. This problem has been particularly acute with those three phase motors of the wound rotor type. In fact, only a relatively minor amount of speed control for this type of motor has been obtained through the use of either of two types of devices. The first of these devices employs a successive plurality of resistors, wired in a parallel-star arrangement, and a switching device for each resistor to selectively connect and disconnect the same in the circuit at will. The second device is a combination of a plurality of parallel resistors and at least one saturable reactor closing a "Y" arrangement. Each of these elements is provided with a respective contact or switching device in order to connect or disconnect the same to the circuit. In both instances the complete circuits are connected to the respective outputs of a rotor of a three phase motor in order to make an electric contact therewith and to shunt a portion of the energy from the mechanical power of the gap, i.e., that power impressed by the stator on the rotor is "extracted" by the resistors and saturating elements, in order to lower its effective value and slow the rotation of the rotor.

It is well known that the above described types of speed controls for three phase motors of the wound rotor type have a number of drawbacks and problems. For example, the control exerted on the speed of the rotor is made basically through extraction of power induced at the rotor and dissipated in the circuit of the external resistors as useless heat, the remaining portion producing a mechanical power at the shaft. Another drawback relating to the prior art control devices is that they are only able to obtain control of the motor for speeds starting from a relatively high given value, e.g. from about 200 RPM, and from this value up in steps, e.g. 100 RPM, until the rated value of the motor under control is obtained. There is no possibility with these devices of obtaining intermediate values to those steps since each value in a series corresponds to disconnecting a resistor or a saturating element from the circuit in order to raise or lower the current by the value of the element which is inserted into or extracted from the circuit.

Furthermore, the energy (watts) consumed by the motor together with the prior art control devices is obtained by means of increased slippage while the mechanical power of the gap is maintain constant as the speed varies. Thus the amount of current taken from the source remains at the same value and the remaining portion of the power employed or taken by the motor is dissipated as heat due to the Joulean effect.

SUMMARY OF THE INVENTION

The present electronic speed control is intended for use in combination with three phase motors of the wound rotor type having a stator fed by three phase current, a rotor on which three phase current is induced from the stator, a shaft upon which the rotor is mounted, a blower fixed to the shaft and a motor housing. The control includes a plurality of electronic elements fixedly mounted with respect to the shaft and connected by their respective cathodes and anodes to pairs of the three phases of the rotor so as to make a number of unidirectional current flow paths, when actuated, between all three phases of the rotor. Each electronic element has a gate connected to a master control circuit through slip rings. The flow of current is controlled by actuating the gates of the electronic elements to cause current flow which short circuits the three phases of the rotor. A controlled current in the approriate amount is passed by the subject control for a precise time resulting in a substantial suppression of the Joulean effect.

It is an object of the present invention to control the speed of three phase motors of the wound rotor type over the entire speed range thereof by a plurality of electronic elements of a suitable type for effecting a regulating function and establishing a number of unidirectional paths for current flow therethrough in order to short circuit all three phases of the rotor.

It is another object of this invention to produce a motor speed control which can obtain a power saving in the range of about 90 percent or higher, relating to the power dissipated by the Joulean effect in the prior art controls, while effectively lowering the mechanical power of the motor gap to slow the rotor speed.

Still another further object of this invention is to teach a method of controlling the speed of three phase motors of the wound rotor type in which only predetermined and preselected portions of the sine wave, corresponding to current inducted in the rotor of the three phase motor, are used to short circuit all phases of the rotor.

The means for accomplishing the above and other objects of the present invention will become apparent from the following detailed description taken in connection with the accompanying drawings.

DESCRIPTION OF THE PREFERRED EMBODIMENTS

Figure 1:
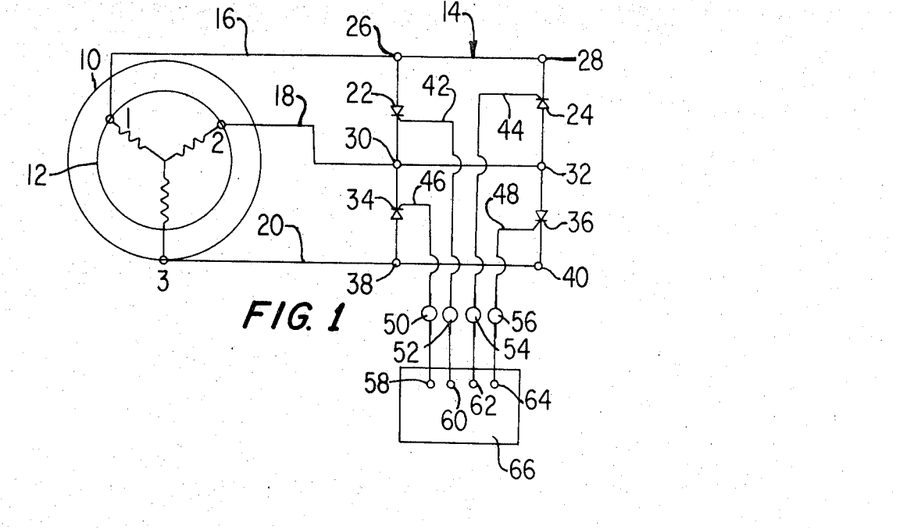
FIG. 1 is a schematic diagram showing a basic circuit of the present motor speed control.

In FIG. 1, a three phase motor 10 having a "Y" shaped wound rotor 12 is diagrammatically shown connected to the control circuit 14 of the present invention. It should be here mentioned that the same principles which apply to the present invention will also apply to delta shaped rotors as well as for other possible rotor configurations. The terminals for each of the three phases of the rotor are designated by numerals 1, 2 and 3, each having a corresponding line 16, 18 and 20 connected thereto.

A pair of electronic elements, shown here as SCR's 22 and 24, are connected in mutually reversed relationship to points 26 and 28, respectively, on line 16. Electronic element 22 has its anode connected to point 26 and the electronic element 24 has its cathode connected to point 28. The cathode of element 22 is connected to line 18 at point 30 while the anode of element 24 is connected to line 18 at 32. Therefore lines 16 and 18 are connected to each other for any bias of the current circulating therethrough.

The other side of line 18 is connected to line 20 by means of another pair of electronic elements 34 and 36, which are similarly positioned in mutually opposing relationship as well as opposing the two electronic elements 22 and 24. Element 34 has its cathode connected to the connection point 30, along with the cathode of element 22, and its anode connected to line 20 at 38. The element 36 has its anode connected to line 18 at 32, along with the anode of element 22, and its cathode connected to line 20 at 40. In this way mutually opposing elements 22 and 24 connect the first and second phase lines while mutually opposing elements 34 and 36 connect the second and third phase lines. Thus it is possible to set up a flow path for any current bias during the several modes of current circulation in the circuit.

Leads 42, 44, 46 and 48, connected to the grid or gate electrode of electronic elements 22, 24, 34 and 36, respectively, are connected to respective slip rings 50, 52, 54 and 56 which are positioned within the casing (not shown) of the motor to electrically contacting terminals on a rotor supporting shaft (also not shown). From the respective slip rings suitable leads are electrically connected to terminals 58, 60, 62 and 64, respectively, of master control circuit 66, shown here in block form. This master control circuit 66 serves to activate the gate of each electronic element 22, 24, 34 and 36 with a biased or polarized voltage so that controlled current can be circulated in the appropriate direction for an accurately controlled time.

The purpose of the control circuit disclosed is to set up a short circuiting of the three phases of the rotor, thus allowing for those currents, which were previously selected and accurately controlled, to flow through the electronic devices 22, 24, 34 and 36 in suitable directions and at suitable times according to the control effected by the master control circuit.

Figure 2:
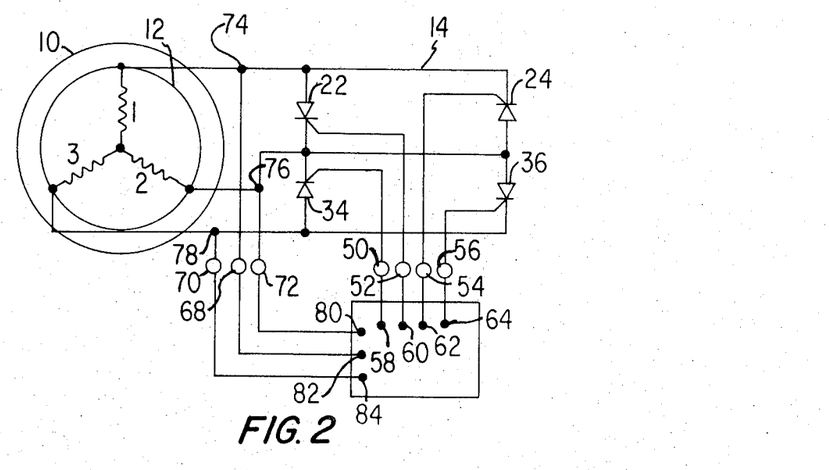
FIG. 2 is a schematic diagram of a first alternate embodiment of the subject motor speed control.

In FIG. 2 the three phases of the rotor are star-connected with the free ends of each winding being suitably connected to the control circuit 14 in the same manner as the first embodiment. Additional slip rings 68, 70 and 72 electrically connect points 74, 76 and 78 of the phase lines to terminals 80, 82 and 84 of the master control. Each of the rotor phases is suitably connected to the thyristors 22, 24, 34, and 36, so as to make the different loops closing the circuit relating the three rotor phases, in order to make the current flow through the rotor windings. Terminals 74, 76 and 78 are used to connect the three rotor phase lines to terminals 80, 82 and 84, respectively, of the master control 66, this latter circuit being illustrated in detail in FIG. 3.

The current appearing at the rotor 12 is three-phase current and cannot be applied directly to the gates of the soild-state rectifiers, since, in order to make them conductive, it is necessary for these elements to have their gates energized with a positive current. Thus the master control 66 must be a full wave rectifier in order to provide the positive DC current required by the gates of the rectifiers.

Figure 3:
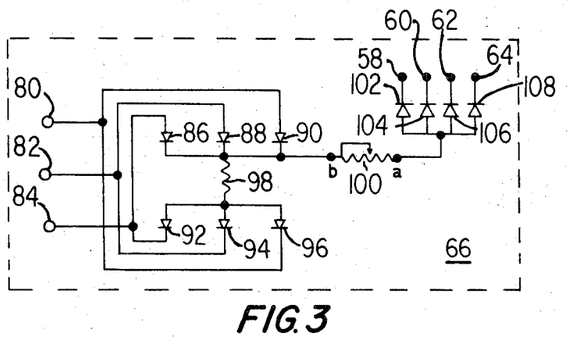
FIG. 3 is a schematic diagram of the master control circuit of FIG. 2.

FIG. 3 shows a schematic diagram of the master control circuit 66 including the following elements: six rectifier diodes 86, 88, 90, 92, 94 and 96, a resistance 98, the purpose of which is to establish a potential difference between the cathodes and anodes of the diodes forming the rectifier circuit, and to provide a positive current which is regulated by potentiometer 100. Positive current is fed through four small diodes 102, 104, 106 and 108 to the gates of the silicon-controlled rectifiers 22, 24, 34, and 36 respectively. It is to be noted that the first portion of the master control circuit is just a rectifier, i.e., it rectifies the three phase current induced in the rotor windings and provides a positive current for the gates. The variable resistance 100 can be any element capable of varying the gate current, for example, the variable resistance element can be a potentiometer, a negative-coefficient resistance, a positive-coefficient resistance, an electronic photocell, a tunnel diode, a resistivity-varying electrode, a magnetic control having rectifier bridge, etc. The four small diodes 102, 104, 106 and 108 are connected to the outlet terminals of the master control at points 58, 60, 62 and 64. These diodes serve to prevent a feedback to the master control which can disturb the signal controlled by the device connected serially between points b and a and, therefore, disturb the rotor speed. The current fed to the gates is a signal or a current permanently applied thereto, meaning that irrespective of the motor conditions, the thyristors represented in FIG. 2 are prepared for conducting current therethrough. Therefore, the motor conditions will be the main source for making these thyristors conduct current of a magnitude determined by the instantaneous mechanical load conditions of the motor itself. That is, the potential between the electrodes changes according to the motor speed. Therefore, if the motor speed, under certain conditions, decreases, the voltage between the thyristor electrodes will increase, thus a greater or lesser magnitude of current will flow in the rotor windings to modify rotor speed.

Figure 4:
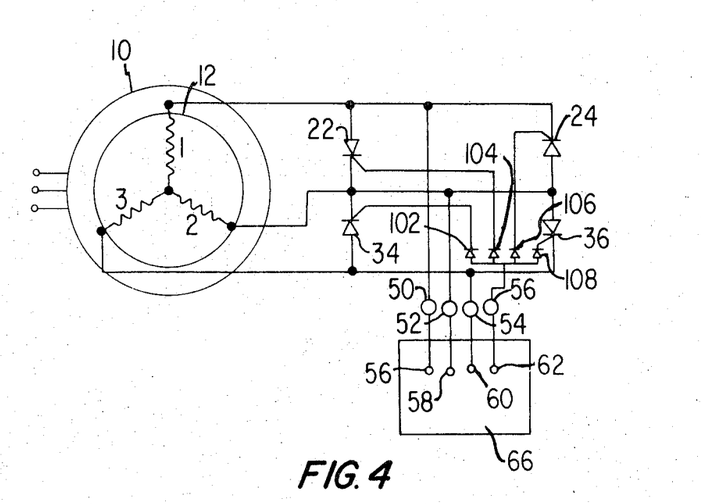
FIG. 4 is a schematic diagram of a second alternate embodiment of the subject motor speed control.
Figure 5:
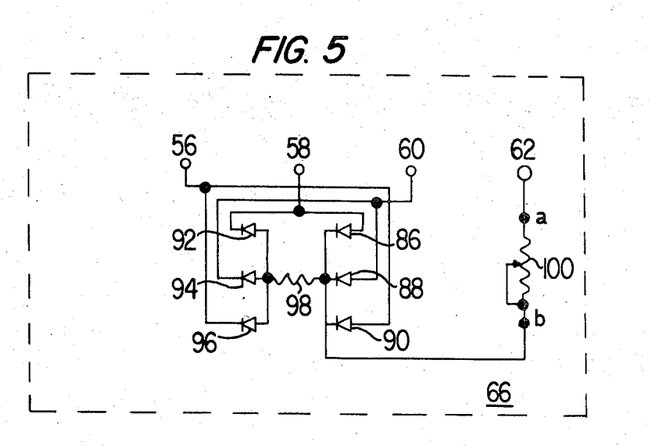
FIG. 5 is a schematic diagram of the master control circuit of FIG. 4.

Reference is now made to FIG. 4 and 5 in which another simplified embodiment of the control circuit is shown. In the above discussed circuit, shown in FIG. 2 and 3, it was observed that there are three current inputs to master control circuit by means of three input terminals and four outlet terminals connected to the thyristor gates. In the embodiment represented in FIGS. 4 and 5, there are only three input terminals 56, 58, 60 for the current to the master control circuit, and one outlet terminal 62. The current feeding line for the gates of the thyristors is further divided for connecting the four small diodes 102, 104, 106 and 108. However, the master control circuit still contains the same elements mentioned for rectifying and controlling the three-phase current and providing a positive direct current to be applied to the gates, thus, the work developed thereby is exactly the same as that disclosed for the embodiment of FIGS. 2 and 3.

Figure 6:
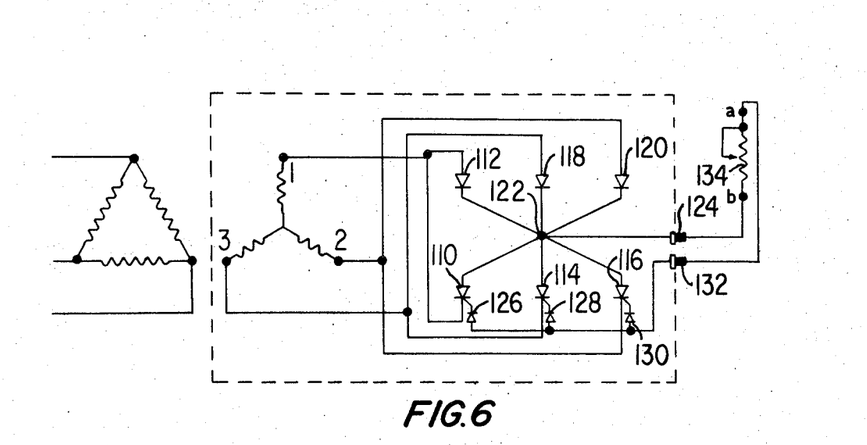
FIG. 6 is a schematic diagram of a third alternate embodiment of the subject motor speed control.

FIG. 6 shows another embodiment in which each phase of the rotor is connected to a circuit including an SCR and diode. Phase one is connected to the cathode of SCR 110 and the anode of diode 112, while phases two and three, respectively, are connected to the cathodes of SCRs 114 and 116 and the anodes of diodes 118 and 120. The anodes of the SCRs and the cathodes of the diodes are all connected to a common point 122 which is in turn connected to slip ring 124. Diodes 126, 128 and 130 are connected between the gate electrodes of SCRs 110, 114, and 116, respectively, and slip ring 132. A variable resistor 134 is connected across slip rings 124 and 132. This resistor is of the type mentioned above in describing resistor 100.

Figure 7:
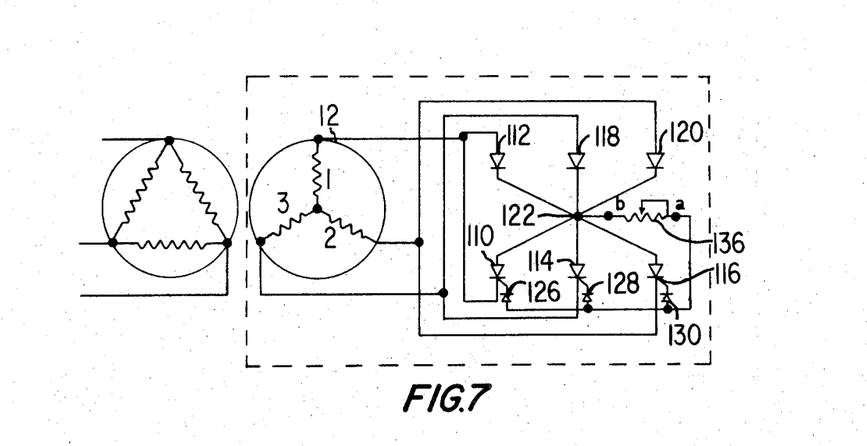
FIG. 7 is a schematic diagram of a fourth alternate embodiment of the subject motor control.

FIG. 7 shows an embodiment similar to that of FIG. 6 except that in this embodiment the point 122 and the anodes of diodes 126, 128 and 130 are directly connected to opposite ends of a light-depending resistance or photo-cell 136. The command action for regulating the speed of the motor is provided by a light beam incident on resistance 136 to regulate the gate current to be delivered to the gates of the SCRs. This embodiment is able to do without slip rings.

Figure 8:
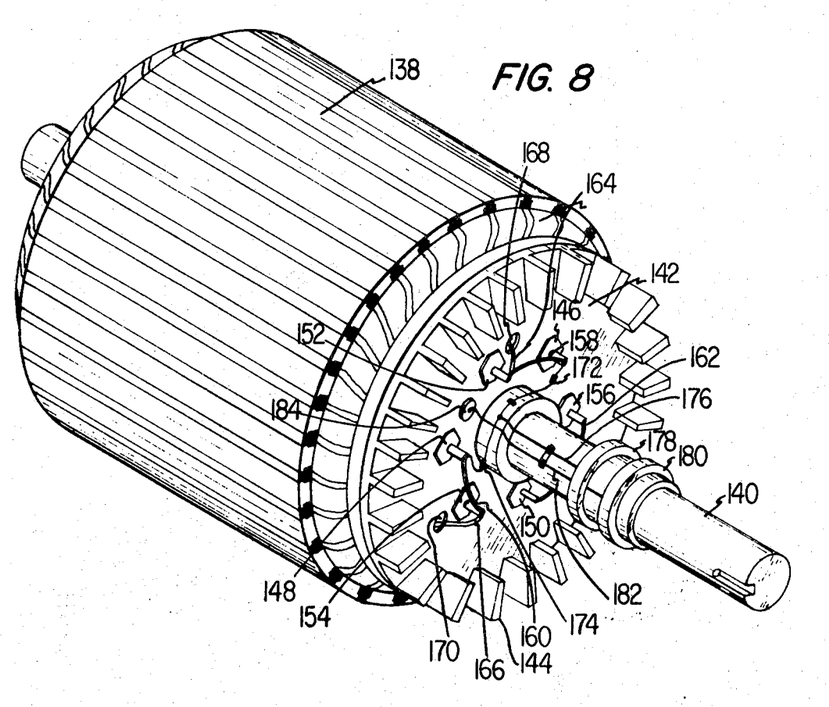
FIG. 8 is a perspective view of a wound rotor of a three phase motor incorporating the subject motor speed control circuit.

FIG. 8 shows a rotor 138 of a wound-rotor alternating current three phase motor with an integrated electronic speed control. The shaft 140 of the rotor is normally supported in a motor casing (not shown) by a pair of spaced bearings (also not shown). A blower 142 having integral blades 144 for moving cooling air is fixed on the shaft 140. Three SCR's 146, 148 and 150 and three diodes 152, 154 and 156 are mounted on the blower 142. The SCR's are electrically connected by their anodes to the blower 142 and the diodes are electrically connected to the blower by their cathodes, thus making the blower a common connection point for all the SCR's and diodes. The cathodes of the SCR's are connected in groups of two to the anodes of the diodes, for example, the cathode of SCR 146 is connected to the anode of diode 152 by means of an electric lead 158; the cathode of SCR 148 is connected to the anode of diode 154 by means of an electric lead 160 and the cathode of SCR 150 is connected to anode of diode 156 by means of electric lead 162. The couples formed by SCR's and diodes are connected to the three terminals of the rotor windings by means of electric leads 164, 166, and a third lead, not shown, through orifices 168, 170 made in the blower. The gate of SCR 146 is connected to diode 172, the gate of SCR 148 is connected to diode 174, and the gate of SCR 150 is connected to a diode, not shown. The latter three diodes are connected at their other side to a common lead 176 and by this lead to slip ring 178. The other slip ring 180 is connected by lead 182 to blower 142.

It should be here noted that the number and arrangement of electronic elements can be varied, it being only necessary that there be suitable number for connecting all three phases of the rotor to each other by means of the elements so as to set up unidirectional current paths from any one phase to each of the other two phases according to the bias or polarization of the current induced on every phase by the stator. The electronic elements 22, 24, 34 and 36 are preferably thyristors but can also be any other similar device having the same effect of operation in regulating the flow of alternating current.

It is known that feeding three-phase power from a source to the stator of a three phase motor of the wound rotor type establishes rotating electromagnetic fields in the motor windings. The current passing through the windings of the stator induces a current in the windings of the rotor. The combined effect of the three-phase current fed to the stator and the current induced in the rotor provides the movement of the rotor in order to obtain, from a three phase electric power source, a rotating movement at the rotor of the motor, which movement is capable of providing mechanical work.

The subject invention concerns a control circuit for three phase motors of the wound rotor type which control circuit allows control of the speed of the motor. In order to clearly understand the function of this control circuit, it is desirable to first consider the intrinsic properties of the motor, as well as the intrinsic properties of the rectifiers or electronic elements, so-called thyristors, since based on the combination of these intrinsic properties the subject speed control for three phase motors was devised.

The motor operation is based on a principle stating that the current induced in a rotor is reversedly proportional to rotor speed; this being due to the electromagnetic field in the stator being a rotating electromagnetic field and the rotor being rotated in the same direction as the stator electromagnetic field. As a consequence, fewer magnetic flow lines are cut by the rotor windings resulting in a lower intensity for the induced current in the rotor. Therefore, when the rotor is rotating at the same speed as the electromagnetic field of the stator, it is said that the rotor is synchronously rotating with the electromagnetic field of the stator, with the speed being the higher or maximum speed for the motor. Accordingly, and based on the above cited principle, under such a circumstance, the strength of the induced field becomes zero. This condition is normally out of reach of any induction motor under normal circumstances due to the so-called "sliding" phenomenon. This phenomenon consists of an out-of-phase relationship for the magnetic fields of the rotor and stator, meaning that it is never possible for the rotor to rotate at the speed of the stator magnetic field. It is to be noted that for each speed of the rotor, there is a correlative strength of the induced field; with this relationship being, of course, reversed. Now then, if the current induced in the rotor is controlled by any suitable means, it will be possible to control the rotor speed.

Considering now the properties of thyristors, these devices are electronic elements functioning as solid state switches which can be controlled by feeding the gate thereof with current. The electronic elements are silicon-controlled rectifiers which, under certain circumstances, can become conductive even without any current at their gates. In this instance, the potential to which each thyristor becomes conductive depends on the structure thereof, so they can become conductive when, as the case may be, a high enough potential is set between the electrodes thereof. However, and as already discussed above, when a signal of a predetermined magnitude is applied to the gates thereof, they conduct current through their electrodes with a potential lower than the maximum value characteristic of the elements. Therefore, when a greater intensity signal is applied to the gate thereof, the difference of potential to which the thyristors become conductive is decreasingly lower and once it has been attained that a current be conducted therethrough, the current can continuously and indefinitely flow through the electrodes, whenever the voltage between the electrodes does not descend to zero.

The principles of working of the thyristors or silicon-controlled rectifiers, together with the properties above mentioned for a wound rotor three phase motor, are the theoretical basis of the subject invention.

Hereinbelow appears the detailed disclosure of the operation of this control:

The basic principle on which the electronic control for wound-rotor induction three phase motors is based, is the highly simple original manner in which the SCRs are controlled, thanks to the employment of the combined characteristics of the type of motor and the SCR characteristics; with this principle being detracted from the known manner of obtaining the trigger of the SCR's. The operation is as follows: at the motor rotor winding, the induced voltage and the speed are reversedly proportional, i.e., when the speed lowers, the induced voltage increases and, reversedly, when the speed increases, the induced voltage decreases. This is determined by the motor characteristics.

SCR's behave as switches that can be opened or closed by selective application of a positive current to their gates. When the current is not applied, the SCR behaves as an open switch, its impedance being so high that the current circulating therethrough is negligible. However, if the current applied thereto is considerably raised, a value is attained to which a passing of current is permitted, known as a forward breakdown voltage. When the positive current at the gate is of zero value, the voltage applied to the SCR between its anode and its cathode must reach forward breakdown voltage in order to let the current pass through the high impedance of the SCR. If the voltage applied to the SCR does not reach the current breakdown voltage, the current will not pass therethrough unless something activates the same, namely, the positive current applied to its gate.

If the SCR gate receives a positive current, relative to its cathode, the voltage applied to its anode and its cathode will open to pass the current without needing for the breakdown value to be reached, it being sufficient to reach the correlative value to the applied positive gate current. Therefore, when a gate current is applied, the SCR will allow the current to pass with a first voltage value. Likewise, when a gate current changes, the SCR will allow the current to pass with a correlative voltage value change. When a gate current different from zero is applied to the SCR gate, there will be a current circulating when the voltage reaches the correlative value to the gate current. Thus, within the characteristic curve of the SCR, there are a number of correlative values for voltage and gate current so that the SCR allows for the passage of the current up to the point wherein, with a peak gate current, the SCR passes the current as soon as a positive and negative potential is applied to its anode and to its cathode, respectively.

Once the charateristics of the motor and the SCR are understood, also the principles and laws will be understood on which the instant electronic speed control for wound rotor induction type three phase motors bases its operation.

When, for instance, the voltages applied to an SCR are of a given value, and the current applied to its gate is the correlative current the motor will be rotating to the selected speed corresponding to that value of gate current.

Let us assume that the motor is stabilized to a determined selected speed with its corresponding load. If the load increases, the motor will tend to slow its speed; but since when the speed is slowed, the motor characteristics cause its induced voltage to increase, this promotes an increase in the voltage applied between the anodes and cathodes of the SCR. This voltage increases to a value where it meets the correlative gate current, which, due to the characteristics of the SCR, provides a greater current to reinforce or strengthen the action of the motor, thus becoming engaged to the control speed as determined by the gate current.

On the contrary, when the load decreases, the motor tends to accelerate which, due to the motor characteristics, would lower the induced voltage, making the applied voltage between the anodes and cathodes of the SCR decrease, and block (due to the SCR characteristics) the current to cut-down the power for the motor at the rotor, until the same is engaged to the control speed as determined by the gate current.

Figure 9:
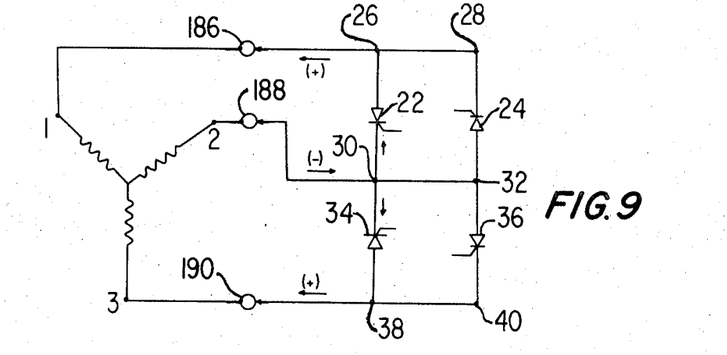
FIG. 9 to 11 are schematic diagrams, similar to FIG. 1, which serve to explain the operation of the subject motor speed control.
Figure 10:
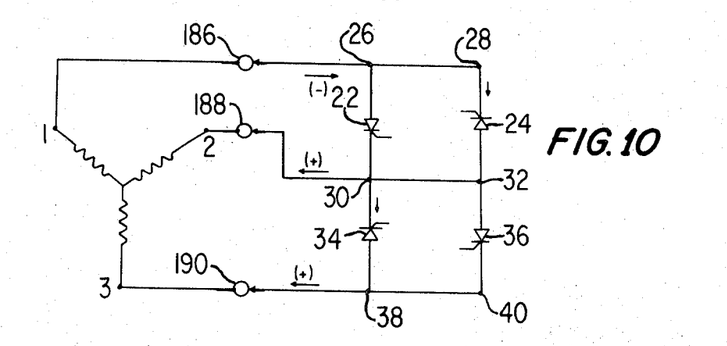
Figure 11:
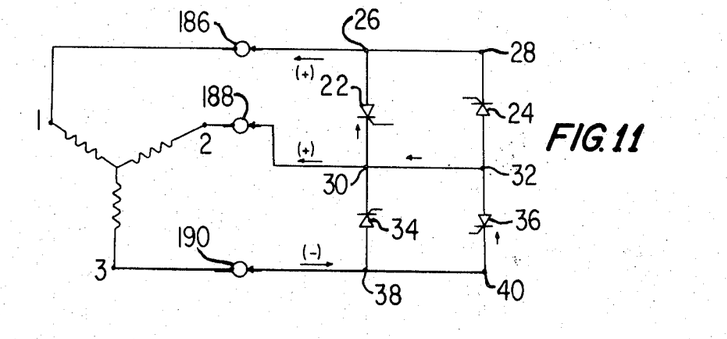

The three phase current provided or supplied to the stator is of such a nature that it can be considered as the feeding of three alternating mono-phase currents, but with a shift therebetween of 120° to each other. This characteristic of the alternating current is the one to take advantage of in order to set the different circuits inside the rotor windings, employing to this end the thyristors or solid-state silicon controlled rectifiers, as the control elements. There are three possibilities for closing the circuit at the rotor windings and, thus, for moving the rotor. These three possibilities for closing the circuit at the rotor windings are illustrated in FIGS. 9, 10 and 11.

A three phase motor of the wound rotor type provided with the present speed control device can effectively control the speed of the rotor with the control being effected from a value as low as substantially 5 percent of the rated motor speed up to the rate value of the motor. Both an increasing and decreasing progression from any given desired value within said range is made possible. For the manner in which the control is effected, reference is made to the following description.

A lead connected to the grid or gate electrode of each of the electronic elements 22, 24, 34 and 36 is electrically connected to the respective lugs 58, 60, 62 and 64, respectively, of a master control circuit 66 represented in block form in FIGS. 1, 2 and 4 and in detail in FIGS. 3 and 5. This tripping circuit or master control circuit is adapted to actuate the gate of each electronic element 22, 24, 34 and 36 so, by means of this energization, the corresponding electronic element will be actuated and current can be circulated following an appropriate direction, the current being circulated in an amount and for a time accurately controlled by a voltage biased or polarized relating to a cathode of the electronic element.

The purpose of the present motor speed control circuit is to set up a short circuiting of the three phases of the rotor thus allowing those currents previously selected and accurately controlled by the electronic devices 22, 24, 34 and 36 to circulate through the circuit in a sense and for the time dictated by the joint functioning of the elements and the master control. In FIG. 9 for instance, there is diagrammatically represented a first condition of the present circuit. In this condition, phase two is negatively biased, that is electrons are flowing from the slip ring 188 connected to phase two through the respective lead in the direction shown by the arrow (−). Upon reaching the connection point 30, the electron flow tends to follow the leads connecting the elements 22 and 34 to the line. However, due to the connection lay out of elements 22 and 34 and also due to the actuation of the grid or gate of respective elements, the electron flow circulates through the elements to points 26 and 38, respectively, and hence as indicated by the arrows (+) towards the slip rings 186 and 190, respectively, and from whence it continues into phases 1 and 3 of the rotor. Due to the reverse position of the elements 24 and 36, the electrons can not flow therethrough and therefor the short circulating will arise only through elements 22 and 34.

FIG. 10 assumes that electrons are flowing from slip ring 186, connected to phase one of the rotor, following the direction of the arrow (−) toward the contact point 26 since element 22 is positioned so as to allow circulation of only a controlled electron in the reverse sense, the phase one electron flow can not flow therethrough but will flow through contact point 28, element 24 and contact point 32 which is directly connected to the slip ring 188 and to phase two. As the phase three is also a positive bias in this instance, it must also be connected to phase one. This condition is obtained through the connection of the lead connecting the element 22 with point 30, which is already actuated by the control command, whereby the electron flow arrives at point 38 and then flows in the direction of the arrow (+) through the slip ring 190. The electrons in this instance cannot flow from phase two to phase three through the element 36 since this element is reversely biased and only permits the flow of electrons in the opposite sense.

Finally, FIG. 11 shows a condition wherein phase three has a negative value, that is electrons will flow from this phase through the slip ring 190 in the direction of the arrow (−) to points 38 and 40. The electrons at point 38 cannot circulate through the element 34 which is reverse biased. But the electrons which reaches point 40 will pass through element 36 which at this instant is actuated by the master control (not shown) and from there the electron flow reaches point 32. Here the electrons can not pass through element 24, which is reverse biased, but will flow through the lead to point 30 where they divide flow through the same lead towards slip ring 188 and through the element 22 which, upon being actuated by the master control, will pass the control electron flow through point 26 and then to slip ring 186 connected to the phase one of the rotor.

From the above it will be seen that for all the three conditions of biasing the circuit of the present invention, a short circuiting will be set up for all the three phases of the rotor of a three phase motor.

As previously discussed, the prior art devices effect control of the speed by increasing the resistance for the rotor circuit. This can be explained by means of the well known equation for obtaining the mechanical power at a gap, i.e. the power transmitted from stator to rotor:

$$P = R/S\ I^2 \tag{I}$$

wherein
P= mechanical power at a gap;
R= resistance of the rotor winding;
S= slippage; and
In= Current induced on said rotor.

According to the above equation, the prior art systems are based, for control or variation of speed, on the change of the relationship R/S by adding an external resistance Re to the resistance of R of the rotor. For the speed changes, the value of S is varied or changed to a particular value in each instance of S', thus leaving:

$$R + Re/S' \tag{II}$$

According to the prior art approach to the problem of varying the speed of a motor, the mechanical power of the gap, i.e., the mechanical power transmitted from the stator to the rotor, is constant upon variation of the speed and likewise, the value of I' (line current) remains at the rated value for full speed. In order to keep the equation (I) valid when the value of the overall resistance $R_t$ is increased at the rotor circuit, wherein $R_t = R + Re$, the value S' can and should correspondingly increase and, therefore, the Joulean effect: $R_T\ I_r^2$ is increased and the energy is dissipated as heat.

Contrary to present invention, in order to control the variation of speed, using the same equation (I), it can be appreciated that a modification from constant mechanical power at the gap to a variable mechanical power at the gap and this is demonstrated by the following.

Since R always remains constant, it can only be changed $I_r$ which is obtained by means of the present control device. Thus the ratio $$I_r^2/S'$$

is modified since when the current is lowered the slippage is increased and the ratio has lower values according to the decreasing speed. Now if this relationship is lowered and R remains the same, the mechanical power at the gap also diminishes thus further reducing the speed. In other words, with the subject control device there is no increase for the Joulean effect as waste, on the contrary, there is a lesser amount of energy taken up from the feeding line when the speed is lowered.

This lesser energy taken up is obtained through the employment of only a desired portion of the entire wave length of the current without interferring at all with the amplitude thereof, as in the case of the prior art control devices which employ the entire wave length but with a substantial portion thereof being disipated as heat by the Joulean effect. Therefore, by controlling, by means of the master control, the magnitude of the total wave length permitted to circulate into the short circuiting connection of the subject control the speed of the motor is also controlled, which control can be effected starting with a value as low as substantially 5% of the rated speed up to the substantial rate speed value of the motor both in an increasing and in decreasing progression starting with any given value to any other value within the rated range.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. A system for controlling the speed of a plural phase induction motor having a rotor assembly including a plurality of rotor windings comprising:
   a plurality of current control means, each including a main current path and a control element for controlling current in the main current path in response to the application of a signal of a given polarity to the control element;
   said current control means having their main current paths connected across said rotor windings for controlling current flow therein; and
   circuit means energized by said rotor windings and connected to each of said control elements;
   said circuit means continuously applying a direct current signal having said given polarity to each of said control elements which varies in amplitude in response to changes in rotor winding voltage due to instantaneous motor speed variations to thereby control said current control means to maintain a given motor operating speed.

2. A system according to claim 1 wherein said current control means comprise controlled rectifiers having an anode-cathode circuit as the main current path and a gate as the control element.

3. A system according to claim 2 wherein said controlled rectifiers are reversedly connected in pairs between said pairs of rotor windings to establish a plurality of unidirectional current paths.

4. A system according to claim 2 wherein said circuit means includes
   full wave rectifier means having inputs connected to said rotor windings and an output connected to each of said gates and applying said given polarity signal thereto.

5. A system according to claim 4 further comprising adjustable bias means adapted to vary the direct current signals fed to said gates for selecting said given operating speed of the motor.

6. A system according to claim 5 wherein said adjustable bias means comprises
   a variable resistance element.

7. A system according to claim 5 wherein said adjustable bias means comprises
   an electronic photocell.

8. A system according to claim 5 wherein said adjustable bias means comprises
   a tunnel diode.

9. A system according to claim 5 wherein said adjustable bias means comprises
   a resistivity varying electrode.

10. A system according to claim 5 wherein said adjustable bias means comprises
    a magnetic control including a rectifier bridge.

11. A system according to claim 1 wherein said circuit means comprises
    rectifier means energized by a plurality of said rotor windings and generating said continuous signal having a given polarity in proportion to the magnitudes of the signals in the rotor windings.

12. A system according to claim 1 wherein said circuit means comprises
    a plurality of diodes;
    each diode connected to a respective rotor winding and being connected together at a common point; and
    resistance means connecting said common point to each of said control elements.

13. A system according to claim 12 wherein said resistance means comprises a resistor; and
    said resistor is variable over a range of resistance values to thereby enable a selection of the operating speed of said motor.

14. A system according to claim 12 wherein said circuit means further comprises
    another plurality of diodes, each connecting said resistance means to its respective control element.

15. A system according to claim 14 wherein the main current paths of each current control means are connected between said common point and a respective rotor winding.

16. A system according to claim 15 wherein said current control means and said circuit means are carried by the rotor assembly of said induction motor.

17. A system according to claim 1 wherein said current control means and said circuit means are contained on the rotor assembly of said induction motor.

18. A system according to claim 1 further comprising a variable bias means commonly connected to each control element for varying the amplitude of said given polarity signal to thereby vary the operating speed of the induction motor.

19. A system according to claim 18 wherein said variable bias means comprises a variable resistor.

20. A system according to claim 1 wherein the main current paths of said current control means are individually connected across different pairs of said rotor windings.

21. In combination with a three-phase electric motor of the type having an inversely related speed and rotor voltage characteristic including a shell, a stator energizable by three-phase current, a rotor including a plurality of rotor windings interconnected in a three-phase configuration in which three-phase currents are induced by said stator, a blower, and a shaft mounted in said shell with said rotor and said blower coupled to rotate jointly therewith, an electronic motor speed control comprising:
    a plurality of electronic switch means fixedly mounted with respect to said shaft and having respective anodes and cathodes connected across said rotor windings so as to make an electric connection, when activated, between all the three-phases of said rotor in order to short circuit said rotor phases, each of said plurality of electronic switch means having a gate electrode; and circuit means energized by a voltage signal from said rotor phases and connected to each of said gate electrodes;

said circuit means continuously applying a positive direct current signal to each of said gate electrodes which varies in amplitude in response to changes in said voltage signal due to instantaneous motor speed variations to thereby control the electronic switch means to maintain a given motor operating speed.

22. A system according to claim 21 wherein said plurality of electronic switch means and said circuit means are mounted on said blower for rotation with said shaft.

23. A system according to claim 21 wherein said circuit means comprises
a plurality of diodes;
each diode connected to a respective rotor winding and being connected together at a common point; and variable bias means connecting said common point to each gate electrode.

24. A system according to claim 23 wherein said circuit means comprises
another plurality of diodes, each connecting said variable bias means to its respective gate electrode.

25. A system according to claim 24 wherein the anodes and cathodes of each electronic switch means are connected to said common point and a respective rotor winding.

* * * * *